United States Patent
Fredrickson et al.

(10) Patent No.: US 6,757,380 B2
(45) Date of Patent: Jun. 29, 2004

(54) IMPEDANCE BLOCKING FILTER CIRCUIT FOR DIGITAL SUBSCRIBER LINE COMMUNICATION SYSTEMS

(75) Inventors: Ronald L. Fredrickson, Hector, MN (US); Donald A. Ward, Danube, MN (US); Brett I. Utesch, Olivia, MN (US)

(73) Assignee: CSI/Suttle Apparatus Corporation, Hector, MN (US)

( * ) Notice: Subject to any disclaimer, the term of this patent is extended or adjusted under 35 U.S.C. 154(b) by 432 days.

(21) Appl. No.: 09/905,249

(22) Filed: Jul. 13, 2001

(65) Prior Publication Data

US 2003/0016814 A1 Jan. 23, 2003

(51) Int. Cl.[7] .......................... H04M 1/00; H04M 11/00; H04M 15/06
(52) U.S. Cl. ................ 379/394; 379/93.14; 379/142.13
(58) Field of Search ........................... 379/93.05, 93.09, 379/142.13, 350, 394, 349.01, 416

(56) References Cited

U.S. PATENT DOCUMENTS 6,028,919 A * 2/2000 Bingel et al. .......... 379/142.13
6,144,735 A * 11/2000 Bella ...................... 379/399.01
6,181,777 B1 1/2001 Kiko ............................ 379/34
6,212,259 B1 4/2001 Kiko ............................ 379/34
6,459,790 B1 * 10/2002 Eckert et al. .......... 379/399.01

OTHER PUBLICATIONS

"Ballot—Standardization of In Line Filters", American National Standard Institute (ANSI), draft document T1E1.4/2001–007R1, May 7–11, 2001.

* cited by examiner

Primary Examiner—Minsun Oh Harvey
Assistant Examiner—Jefferey Harold
(74) Attorney, Agent, or Firm—Westman, Champlin & Kelly, P.A.

(57) ABSTRACT

An impedance blocking filter circuit is used in telecommunication systems for interconnecting between incoming telephone lines carrying Digital Subscriber Line (DSL) signals and a customer's terminal equipment in order to block impedances above a desired frequency. The impedance blocking filter circuit includes a low pass filter circuit having at least one capacitive pole providing component. The impedance blocking filter circuit also includes a tank circuit coupled in series with the at least one capacitive pole providing component to provide impedance matching for the customer's terminal equipment.

7 Claims, 2 Drawing Sheets

IMPEDANCE BLOCKING FILTER CIRCUIT FOR DIGITAL SUBSCRIBER LINE COMMUNICATION SYSTEMS

BACKGROUND OF THE INVENTION

The present invention relates generally to telecommunication systems. More particularly, the present invention relates to impedance blocking filter circuits used in telecommunication systems for interconnecting between incoming telephone lines from a telephone company's central office and subscriber or customer telephone equipment.

Frequently, subscribers or customers of telephone service also have, in addition to one or more telephone handsets, a personal computer which requires telephone line access to the Internet or other computer networks. As is known in the art, a computer user can in some instances receive DSL (an acronym for Digital Subscriber Line) signals from the Internet over the same telephone lines via an Internet Server Provider (ISP). In order to increase the speed of downloading of information from the Internet, a DSL network interface is typically purchased and installed between the incoming telephone lines and the user's computer. However, since one or more of the telephone subscriber's terminal equipment devices (such as telephone sets, facsimile machines and/or answering devices) may also be connected to the same incoming telephone lines via internal house wiring, DSL interference problems may be caused by the terminal equipment. This can significantly limit or reduce the data rate of the DSL signals.

Telecommunication industry standards, such as described in ANSI's (American National Standard Institute) draft document T1E1.4/2001-007R, generally require the use of impedance blocking circuits between DSL lines from a phone company and a subscriber's terminal equipment (telephone handsets, fax machines, etc). Impedance blocking filter circuits for such use are known. For example, U.S. Pat. Nos. 6,181,777 and 6,212,259, each to F. Kiko and entitled IMPEDENCE BLOCKING FILTER CIRCUIT, teach circuits which can be used for this purpose. However, some impedance matching circuits designed for this purpose are fairly complex. As a result, some of these circuits are more expensive to produce than is desired. Further, some of these impedance matching circuits are relatively difficult to adjust for use with different telephone systems having different impedance matching and other requirements.

Accordingly, it would be desirable to provide an impedance matching or blocking filter circuit, for connection between a DSL line and a customer's telephone terminal equipment, which is inexpensive to manufacture and easily adaptable to different telephone systems.

SUMMARY OF THE INVENTION

An impedance blocking filter circuit is used in telecommunication systems for interconnecting between incoming telephone lines carrying Digital Subscriber Line (DSL) signals and a customer's terminal equipment in order to block impedances above a desired frequency. The impedance blocking filter circuit includes a low pass filter circuit having at least one capacitive pole providing component. The impedance blocking filter circuit also includes a tank circuit coupled in series with the at least one capacitive pole providing component to provide impedance matching for the customer's terminal equipment.

DETAILED DESCRIPTION OF AN ILLUSTRATIVE EMBODIMENT

Figure 1:
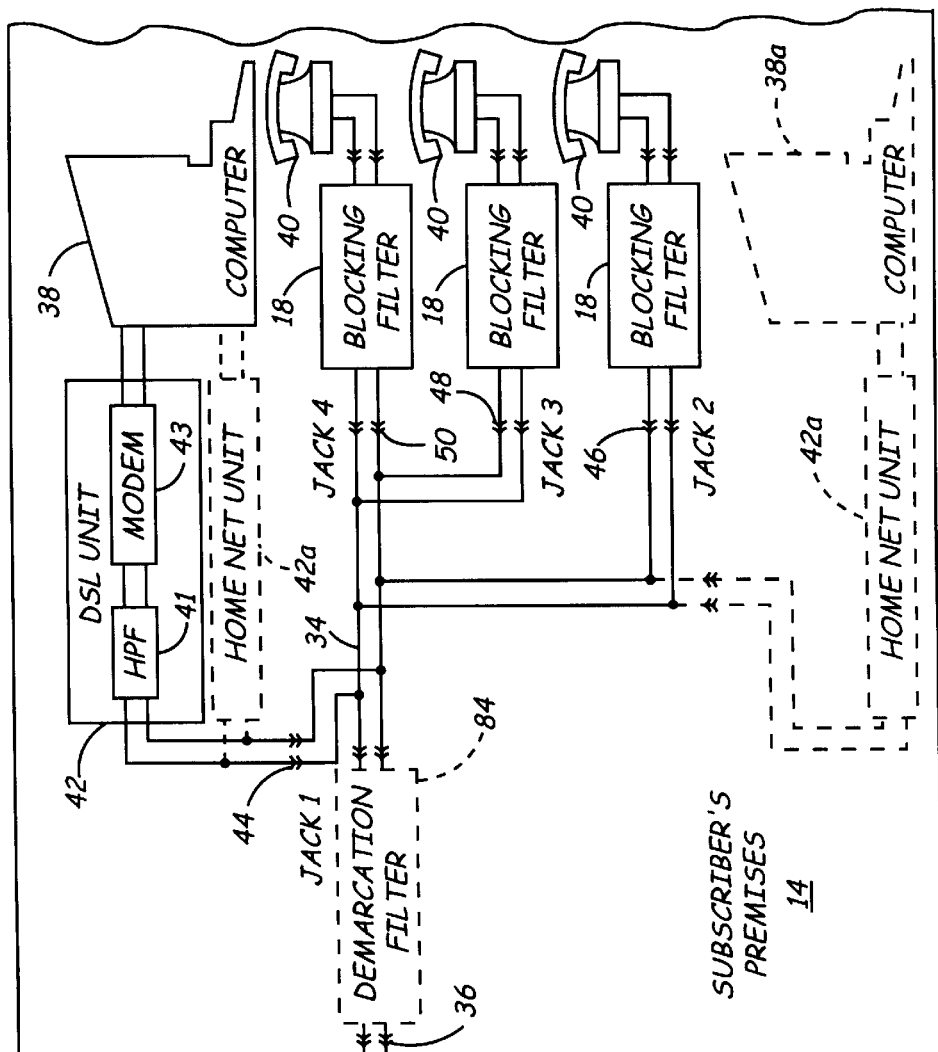
FIG. 1 is a block diagram illustrating a telecommunication system environment in which the DSL in-line filters of the present invention are used.

FIG. 1 is a block diagram illustration of a telecommunication system 10 for interconnecting a telephone company's central office (CO) 12 and a subscriber's premises 14 over a transmission media such as a conventional twisted pair of telephone lines 16. The telecommunication system 10 employs a plurality of impedance blocking filter circuits 18, constructed in accordance with the principles of the present invention. Each of the filter circuits can be contained in a modular housing.

The central office 12 includes a telephone office switch 20 and an Internet Service Provider (ISP) 22. The telephone office switch 20 is used to send voice signals via a low-pass filter 24 and a surge protector 26 to the telephone line 16. The ISP 22 transmits DSL data signals to a modem 28 which are then sent to the telephone lines 16 via a high-pass filter 30 and the surge protector 26. It should be understood that the voice signals from the telephone office switch 20 and the DSL data signals from the ISP 22 can be transmitted simultaneously to the telephone lines 16. Further, the voice signals (speech) are in the frequency band between 300 and 3400 Hz, and the DSL data signals are in the frequency band between 20 KHz and 1.1.

The subscriber's premises 14 includes a Network Interface Device (NID)/surge protector unit 32 which is connected to the incoming telephone lines 16 on its input side and is connected to the subscriber's internal wiring or house wiring 34 on its output side via a demarcation RJ-11 jack and plug unit 36. As can be seen, the subscriber's premises further includes a number of terminal equipment devices, such as a plurality of telephone sets 40. At times, the computer user will be downloading information to a personal computer 38 from the Internet by receiving DSL data signals transmitted by the ISP 22.

In order to optimize the downloading of this information from the Internet, the user can purchase and install a DSL network interface unit 42 for connection between the computer 38 and a RJ-11 jack and plug unit 44. The DSL network interface unit 42 includes a high-pass filter 41 connected to the RJ-11 unit 44 and an internal modem 43 connected to the computer 38. The RJ-11 unit 44 is connected to the house wiring 34 for receiving the DSL signals from the telephone lines 16. The plurality of telephone sets 40 are also connected to the same house wiring 34 via RJ-11 units 46, 48 and 50, respectively.

If it were not for the impedance blocking filter circuits 18 of the present invention, the output impedance from each of the telephone sets 40 would be connected in parallel with the input impedance of the DSL unit 42. Since the output impedances from the telephone sets are subject to wide variations due to, for example, changing from "on-hook" to "off-hook" so as to present either an open, a short, capacitive, inductive, resonant, or any combination thereof at frequencies above 20 KHz, this erratic impedance can significantly affect the rate of the DSL data signals being received by the computer 38 via the DSL network interface unit 42.

The impedance blocking filter circuits 18 of the present invention serve to isolate the terminal equipment (telephone sets, for example) impedances from the DSL unit 42 and the house wiring 34 so as to eliminate degradation of the performance of the DSL unit 42. Further, the impedance blocking filter circuits serve to attenuate the DSL data signal received by the telephone sets 40 in order to prevent non-linear conversion to voice band signals. As described previously, some prior art impedance matching, blocking or isolation circuits which are used for these purposes are complex and are thus correspondingly relatively expensive to fabricate. Further, some are relatively inflexible so as to make it difficult to easily adapt the circuits for use with differing phone systems having differing filter performance requirements. Filter circuits 18 of the present invention addresses these needs.

Figure 2:
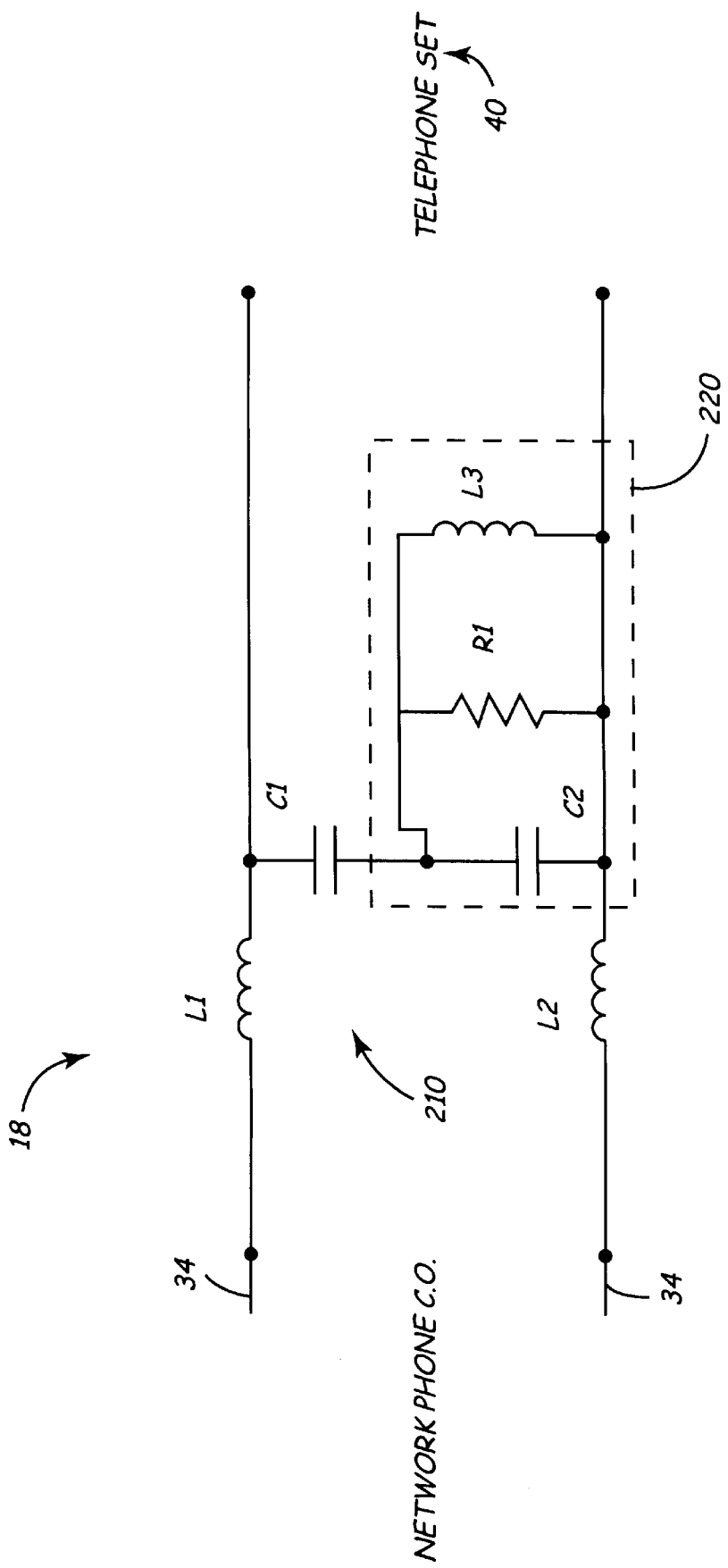
FIG. 2 is a circuit diagram illustrating the in-line filters of the present invention.

FIG. 2 is a circuit diagram illustrating an in-line filter circuit 18 which provides impedance blocking or matching of the impedance of the telephone handset 40 or other terminal equipment. Circuit 18 includes a low pass filter 210 formed generally by inductor L1, capacitor C1 and inductor L2 coupled in a series circuit arrangement. Also included in circuit 18 is a tank circuit 220. Tank circuit 220 is coupled in series with capacitor C1 between capacitor C1 and inductor L2, though it can be connected in an electrically similar or equivalent manner. For example, tank circuit 220 could be coupled in series between inductor L1 and capacitor C1.

Tank circuit 220 includes a capacitor C2, a resistor R1 and an inductor L3 coupled in a parallel. In addition to parallel LRC tank circuit configurations, other tank circuit configurations can be used in DSL in-line filter 18. In effect, the tank circuit 220 is inserted into the capacitive element of the low pass filter 210.

While low pass filters have been used in telecommunication systems for interconnecting a telephone company's phone lines to terminal equipment at a subscriber's premises, inclusion of tank circuit 220 in filter circuit 18 provides a new approach to addressing industry requirements relating to impedance matching when DSL service is provided. The tank circuit is applied to the capacitor pole of the low pass filter to achieve the proper impedance matching and optimum return loss for these types of circuits.

As compared to other DSL in-line circuits, particularly those using magnetically switched relays, circuit 18 will achieve the impedance matching design requirements at a lower cost and with greater reliability. This is due in part to the fact that there are no moving components contained within circuit 18. Further, the design of DSL in-line circuit 18 allows this circuit to function under all standard telephone signaling loop conditions. This is primarily due to the fact that circuit 18 will not exhibit a dependency upon the loop current flowing through the coils to activate any magnetic reed relays.

In one exemplary embodiment, the component values used in DSL in-line circuit 18 are as follows:

TABLE 1

| COMPONENT | VALUE |
|---|---|
| L1 | 4.2 mH |
| C1 | 15 nF |
| L2 | 4.2 MH |
| C2 | 1.0 nF |
| R1 | 680 ohms |
| L3 | 2.2 mH |

However, the present invention is not limited to these particular component values, nor to particular ratios of component values. Circuit 18 can be easily adapted for use with phone systems having differing impedance matching and/or frequency requirements by adjusting the values of components of tank circuit 220. Thus, circuit 18 can be produced in large quantities for differing phone systems with less cost than conventional solutions to DSL in-line filter requirements.

Although the present invention has been described with reference to preferred embodiments, workers skilled in the art will recognize that changes may be made in form and detail without departing from the spirit and scope of the invention. These and other embodiments of the disclosed method are within the scope of the invention.

What is claimed is:

1. An impedance blocking filter circuit used in telecommunication systems for interconnecting between incoming telephone lines carrying Digital Subscriber Line (DSL) signals and a customer's terminal equipment to block impedances above a desired frequency, the impedance blocking circuit comprising:

a low pass filter circuit having at least one capacitive pole providing component; and a tank circuit coupled in series with the at least one capacitive pole providing component to provide impedance matching for the customer's terminal equipment.

2. The impedance blocking filter circuit of claim 1, wherein the tank circuit includes a first capacitor, a first resistor and a first inductor coupled in parallel.

3. The impedance blocking filter circuit of claim 1, wherein the capacitive pole providing component is a second capacitor coupled in series with the tank circuit.

4. The impedance blocking filter circuit of claim 3, wherein the low pass filter comprises second and third inductors coupled in series with the tank circuit and the second capacitor.

5. The impedance blocking filter circuit of claim 4, wherein the tank circuit is coupled in series between the second capacitor and the third inductor.

6. The impedance matching filter circuit of claim 5, and further comprising a first terminal coupled to the second inductor and a second terminal coupled to the third inductor, the impedance matching filter circuit being coupleable to telephone lines via the first and second terminals.

7. The impedance matching filter circuit of claim 6, and further comprising a third terminal coupled between the second inductor and the second capacitor and a fourth terminal coupled between the tank circuit and the third inductor, the impedance matching filter circuit being coupleable to the customer's terminal equipment via the third and fourth terminals.

* * * * *